US009845699B2

(12) United States Patent
Feeney

(10) Patent No.: US 9,845,699 B2
(45) Date of Patent: Dec. 19, 2017

(54) FAN SPACER HAVING UNITARY OVER MOLDED FEATURE

(71) Applicant: GKN Aerospace Services Structures, Corp., Cromwell, CT (US)

(72) Inventor: Christopher J. Feeney, Wallingford, CT (US)

(73) Assignee: GKN Aerospace Services Structures Corp., Cromwell, CT (US)

( * ) Notice: Subject to any disclaimer, the term of this patent is extended or adjusted under 35 U.S.C. 154(b) by 732 days.

(21) Appl. No.: 13/833,162

(22) Filed: Mar. 15, 2013

(65) Prior Publication Data

US 2014/0271143 A1 Sep. 18, 2014

(51) Int. Cl.
*F01D 11/00* (2006.01)
*B29C 45/14* (2006.01)
*B29C 70/68* (2006.01)

(52) U.S. Cl.
CPC ............ *F01D 11/008* (2013.01); *B29C 45/14* (2013.01); *B29C 70/68* (2013.01); *F05D 2220/36* (2013.01); *F05D 2250/11* (2013.01); *F05D 2300/603* (2013.01); *Y02T 50/672* (2013.01)

(58) Field of Classification Search
CPC .......... F01D 5/146; F01D 9/041; F01D 11/00; F04D 29/681; F05D 2240/126; F05D 2240/12; F05B 2240/33; B29C 45/00; B29C 70/48; B29C 45/14
See application file for complete search history.

(56) References Cited

U.S. PATENT DOCUMENTS

| 4,655,687 A | * | 4/1987 | Atkinson | ................ F01D 5/323 416/190 |
| 4,935,184 A | | 6/1990 | Sorensen | |
| 5,049,035 A | * | 9/1991 | Marlin | ...................... F01D 5/22 416/193 A |
| 5,193,982 A | * | 3/1993 | Inizan | ................... F01D 11/008 416/193 A |

(Continued)

FOREIGN PATENT DOCUMENTS

| EP | 0811753 A1 | 12/1997 |
| EP | 1046785 A2 | 10/2000 |

(Continued)

OTHER PUBLICATIONS

Provisional Application Filing date Aug. 17, 2012.*
(Continued)

*Primary Examiner* — Mark Laurenzi
*Assistant Examiner* — Shafiq Mian
(74) *Attorney, Agent, or Firm* — Bejin Bieneman PLC

(57) ABSTRACT

A fan spacer for placement between a pair of adjacent blades in a fan assembly and a related method of making. The fan spacer has a spacer body including an airflow surface shaped to direct air between the pair of adjacent blades in which the airflow surface is shaped on opposing sides to correspond to the pair of adjacent blades. An over molded feature is molded onto the airflow surface of the spacer body in which the over molded feature both includes an erosion coating on the airflow surface and, on the two opposing sides, seals configured to seal against the pair of adjacent blades on the opposing sides of the airflow surface.

14 Claims, 4 Drawing Sheets

(56) References Cited

U.S. PATENT DOCUMENTS

| | | | | |
|---|---|---|---|---|
| 5,464,326 | A * | 11/1995 | Knott | F01D 11/008 |
| | | | | 416/193 A |
| 6,217,283 | B1 * | 4/2001 | Ravenhall | F01D 5/225 |
| | | | | 415/9 |
| 6,419,446 | B1 * | 7/2002 | Kvasnak | F01D 5/145 |
| | | | | 415/116 |
| 6,814,541 | B2 | 11/2004 | Evans et al. | |
| 7,837,918 | B2 * | 11/2010 | Yonemochi | B29C 37/0028 |
| | | | | 264/255 |
| 7,942,636 | B2 | 5/2011 | Evans | |
| 7,950,900 | B2 * | 5/2011 | Mulcaire | F01D 11/008 |
| | | | | 415/191 |
| 8,777,576 | B2 * | 7/2014 | Kray | F01D 5/3007 |
| | | | | 416/190 |
| 9,145,784 | B2 * | 9/2015 | Evans | F01D 5/3092 |
| 9,297,268 | B2 * | 3/2016 | Alarcon | F01D 11/008 |
| 2008/0124222 | A1 * | 5/2008 | Vontell | F01D 5/18 |
| | | | | 416/224 |
| 2008/0232969 | A1 * | 9/2008 | Brault | F01D 5/22 |
| | | | | 416/219 R |
| 2011/0243709 | A1 * | 10/2011 | El-Aini | F01D 5/26 |
| | | | | 415/1 |
| 2012/0156045 | A1 | 6/2012 | Ammann | |
| 2012/0263595 | A1 * | 10/2012 | Evans | F01D 5/3092 |
| | | | | 416/189 |
| 2015/0204201 | A1 * | 7/2015 | Turner | F01D 5/143 |
| | | | | 416/179 |

FOREIGN PATENT DOCUMENTS

| | | |
|---|---|---|
| GB | 2257755 A | 1/1993 |
| GB | 2279413 A | 1/1995 |
| JP | 2000-320491 A | 11/2000 |
| JP | 2004-285864 A | 10/2004 |
| JP | 2006-110995 A | 4/2006 |
| JP | 2006-515649 A | 6/2006 |

OTHER PUBLICATIONS

PCT International Search Report, PCT/US2014/019803, dated Jul. 16, 2014, 4 pages.

"Viton", From Wikipedia, the Free Encyclopedia, en.wikipedia.org/wiki/Viton, printed Feb. 6, 2013, 3 pages.

Japanese Patent Office—Office Action for JP Application No. 2016-500542, dated Jan. 10, 2017 (4 pages; with English translation).

* cited by examiner

US 9,845,699 B2

FAN SPACER HAVING UNITARY OVER MOLDED FEATURE

CROSS-REFERENCE TO RELATED APPLICATIONS

Not applicable

STATEMENT OF FEDERALLY SPONSORED RESEARCH OR DEVELOPMENT

Not applicable.

BACKGROUND

This disclosure relates to fan spacers, annulus fillers or fan platforms for use in jet engines or other turbo engines.

Jet engines are used to power and provide thrust for an aircraft. These jet engines typically include a gas turbine that intakes air at a front end, compresses the air within a compressor section of the engine, injects fuel into the compressed gas, combusts this gas to produce a high-pressure, high velocity gas, and expels this gas out through a turbine section. In a jet engine the compressor and turbine elements are disposed along a single shaft that substantially runs the length of the engine and also supports a fan near its front end. During operation of the engine, the turbine drives rotation of the shaft, which causes the rotation of both the compressor and the fan. As the blades of the fan rotate, they propel air which generates the majority of the thrust of the engine. In most cases, a significant portion of the air moved by the fan is bypass air, which does not flow through the gas turbine section of the engine.

A typical fan section of an engine includes an annular-shaped fan case and the front end of the shaft that supports the various fan blades which extend in a generally radial direction from the shaft toward the fan case. At the front end of the shaft, there is initially a nose cone which directs the flow of air as it enters the intake of the fan before the fan blades. To further control the flow of air about the roots of the fan blades, at the downstream end of the nose cone, there are usually fan spacers (also known as annulus fillers or fan platforms) that span the circumferential gaps between the roots of the blades.

SUMMARY

Prior to installation between the blades, fan spacers typically separately receive an erosion coating on their airflow surface and have seals attached to their edges for contact with the adjacent fan blades. The seal on one side seals against the back, or downstream side, of the adjacent blade and the seal on the other side seals against the front, or upstream side, of the other adjacent blade. Because the processes used to form the body of the fan spacer and to form the erosion coating and the seals are very different from one another, conventionally the body of the fan spacer is produced at a first location and then the fan spacer is sent to different locations to have the erosion coating sprayed on and the seals adhered or otherwise attached to the opposite sides.

However, this multi-location production schema can be costly, inefficient, and result in bottlenecks in production. Thus, there is a need for improved processes to produce fan spacers.

The disclosed invention offers an improved fan spacer structure and process of making the fan spacer that overcome the current problems with the multi-location production in which multiple divergent processes (e.g., spacer body formation, erosion coating spraying, and seal attachment) are required in order to form the fan spacer.

This invention provides a fan spacer or other component having an airflow surface, and related method of making the same, in which the erosion coating and seal(s) are over molded onto the body of the component. This means that both the erosion coating and the seal(s) can be formed in place on the spacer or body and potentially share some of the same production fixtures. This greatly improves the efficiency of the production process and eliminates the divergent processes that have previously inhibited production of parts of this kind.

According to one aspect of this invention, a fan spacer is disclosed for placement between a pair of adjacent blades in a fan assembly. The fan spacer includes a spacer body including an airflow surface shaped to direct air between the pair of adjacent blades in which the airflow surface is shaped on opposing sides to correspond to the pair of adjacent blades. An over molded feature is molded onto the airflow surface of the spacer body. This over molded feature both includes an erosion coating on the airflow surface and, on the two opposing sides, seals configured to seal against the pair of adjacent blades on the opposing sides of the airflow surface.

As they are molded together, the erosion coating and the seals are unitary and integrally formed with one another.

In some forms, the over molded feature may be a urethane material.

Although the spacer body may be any one of a number of various geometries, in one form, the spacer body may have a generally triangular-shaped body extending from a forward end to a rearward end in a longitudinal direction. With this shape, the airflow surface and the erosion coating may be disposed on one of the three sides of the generally triangular-shaped body and the seals may be provided on the corners that are adjacent to the side of the triangle providing the airflow surface.

As the seals are for sealing the surface of the adjacent blades or rotors, which are curved, each of the opposing sides may be curved to match their profile and provide a good seal.

Although the spacer body itself may be made from a number of different materials, in one particular form, the spacer body may be a composite component comprising a plurality of plies of fabric and a binder that form a laminate. The binder may be a curable resin that is placed within the fabric using resin transfer molding (RTM) and cured. Alternatively, if the spacer body is a composite, then it is contemplated that it might be formed using any composite forming technique.

According to another aspect of this invention, an engine having a fan assembly including this fan spacer of the type described herein is disclosed.

According to yet another aspect of this invention, a method is disclosed of making a fan spacer for placement between a pair of adjacent blades in a fan assembly. This method includes the step of molding an over molded feature onto the spacer body in which the over molded feature includes an erosion coating on the airflow surface and, on the two opposing sides, includes seals configured to seal against the pair of adjacent blades.

In one form, the method may also include the step of forming the spacer body, prior to molding the over molded feature onto the spacer body. This formation of the spacer body may include laying a plurality of plies to define a shape of the spacer body and binding the plies together with a resin binder.

In some forms of the method, the spacer body may be formed in a multi-part mold. Once the spacer body is formed, then a first mold portion of the multi-part mold may be removed to expose the airflow surface on the spacer body, without fully removing the spacer body from the multi-part mold. A second mold portion may be placed over the airflow surface and onto the multi-part mold before molding the over molded feature in which the second mold portion defining at least a portion of the over molded feature. In this instance the molding of the over molded feature may occur in a volume between the spacer body and the second mold portion to form the over molded feature.

Again, the over molded feature may comprise a urethane material and the erosion coating and the seals are unitary and integrally molded with one another.

It is contemplated that the disclosed over molded feature and related method of making could be employed on other similar components having an air flow surface. Thus, according to still yet another aspect of the invention, an airflow component includes a body having an airflow surface shaped to direct air and having at least one edge bounding the airflow surface. The airflow component further includes an over molded feature molded onto the airflow surface of the body in which the over molded feature both includes an erosion coating on the airflow surface and a seal on the at least one edge of the airflow surface.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

DETAILED DESCRIPTION

Figure 1:
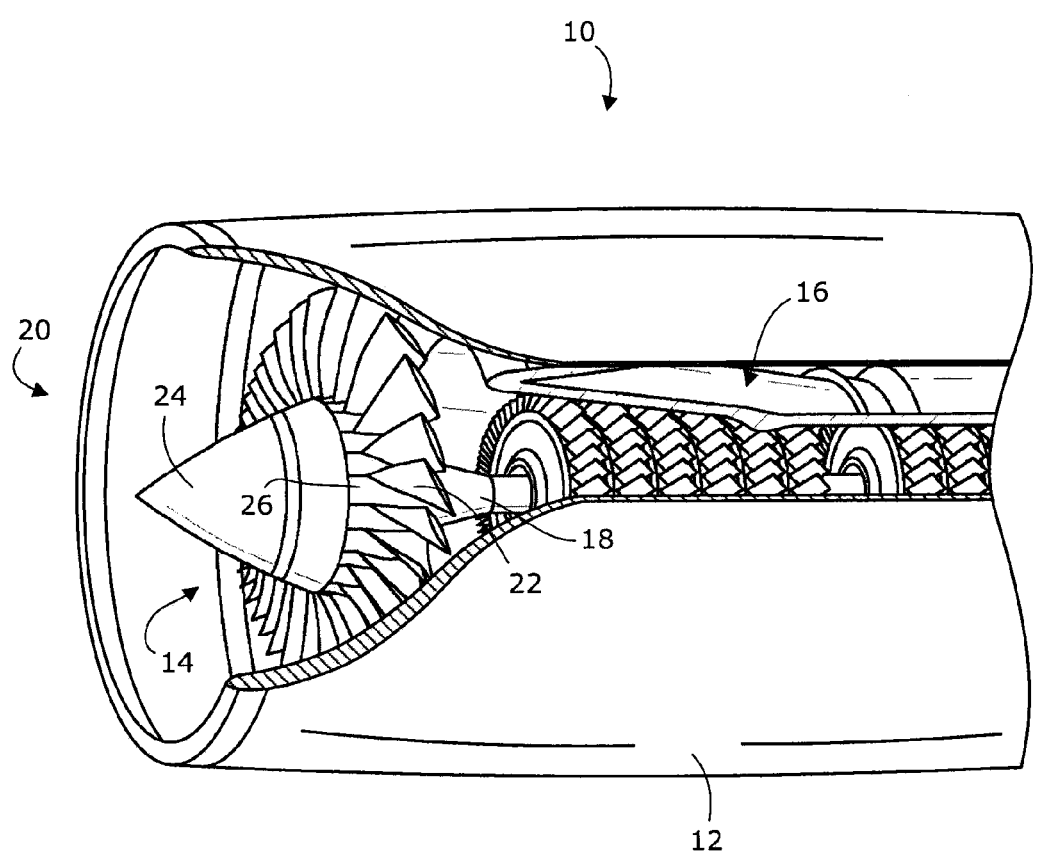
FIG. 1 is a side perspective view of a jet engine with a partial break away of the nacelle revealing a portion of the fan assembly and turbo engine.
Figure 2:
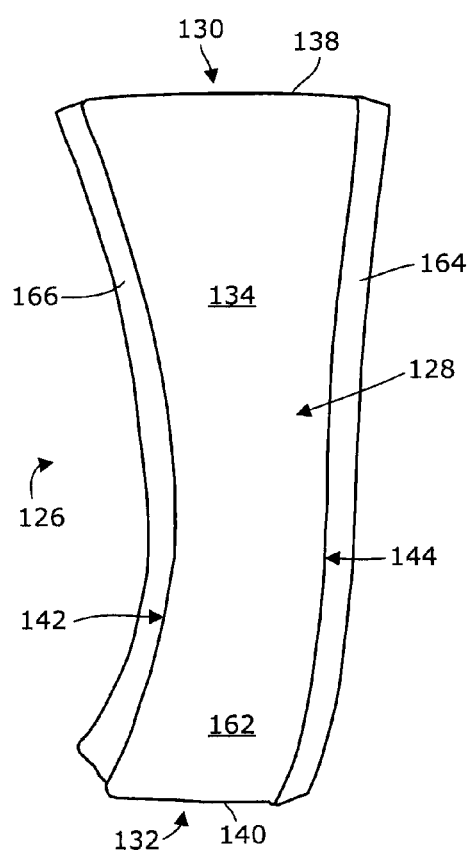
FIG. 2 is a front view of a conventional fan spacer with a sprayed on erosion coating and in which two seals are separately attached to the sides of the fan spacer.
Figure 3:
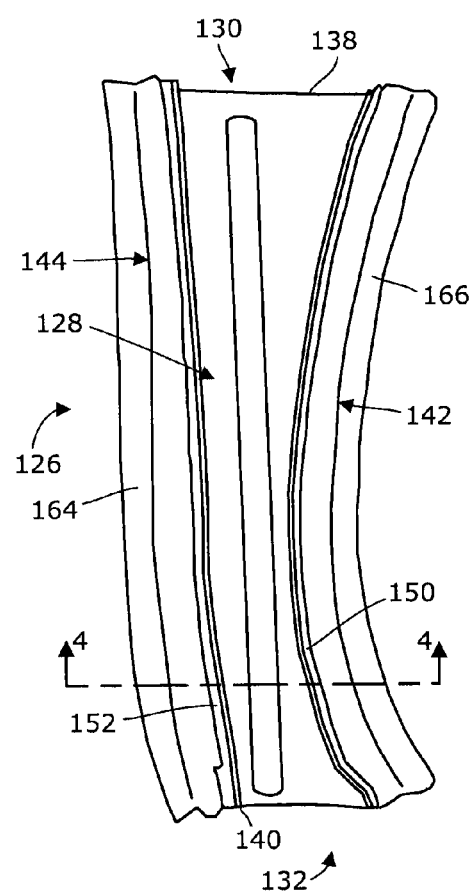
FIG. 3 is a rear view of the fan spacer of FIG. 2.

Referring first to FIG. 1, a forward portion of an exemplary jet engine 10 is illustrated for air intake during engine operation. The jet engine 10 includes a nacelle 12 that houses a fan assembly 14 and a turbo engine 16 that are both disposed along a central shaft 18. In typical operation, air flows in the intake end 20 of the engine 10 and into the fan assembly 14. A portion of this air flows into the turbo engine 16 where the air is compressed and assists in fuel combustion, the expelled gas from which is used to drive a turbine that, in turn, effectuates the rotation of the central shaft 18 and its connected elements including the fan assembly 14. While a portion of the air entering the engine 10 is received in the turbo engine 16, the majority of the air moved by the fan assembly 14 actually flows around the turbo engine 16 in the space between the turbo engine 16 and the nacelle 12 and is used to generate thrust.

Looking more closely at the fan assembly 14, the fan assembly 14 includes a plurality of fan blades 22 or rotors that are connected to a hub or disk which is connected to the axially-extending central shaft 18 and which extend away from the shaft 18 in a generally radial direction. On the intake side of the fan blades 18, a nose cone 24 directs air around the area of the central shaft 18 and back to the fan blades 22 near their roots. Downstream of the nose cone 24 and in the inter-circumferential space between the roots of the fan blades 22 are a plurality of fan spacers 26. The fan spacers 26 are connected to the hub or disk which is connected to the central shaft 18 occupying the space between adjacent pairs of fan blades 22 and assist in directing the flow of air in the space between the fan blades 18.

Now with additional reference to FIGS. 2 through 5, a conventional fan spacer 126 is illustrated in detail. The fan spacer 126 includes a spacer body 128 which, in the form shown, is a generally triangular-shaped body. This spacer body 128 has a triangular cross section of varying size over its length. The spacer body 128 extends from a forward end 130 to a rearward end 132 in a longitudinal direction. When the fan spacer 126 is installed in a fan assembly such as the illustrated fan assembly 14, the forward end 130 of the fan spacer 126 is oriented toward the nose cone 24 and intake end 20 of the engine 10 while the rearward end 132 of the fan spacer 126 is oriented toward the turbo engine 16 and the exhaust end of the engine 10.

One of the outer surfaces of the triangular-shaped body provides an airflow surface 134 on a front wall 136 of the spacer body 128. The airflow surface 134 on the front wall 136 faces generally radially outward when the fan spacer 126 is attached to the central shaft 18 or is received on a central hub thereof. The airflow surface 134 is generally bound by a front edge 138 at the forward end 130 of the spacer body 128, a rear edge 140 at the rearward end 132 of the spacer body 128, and a pair of opposing sides 142 and 144 that are curved and extend from the front edge 138 to the rear edge 140. The airflow surface 134 is shaped on its opposing sides 142 and 144 to correspond to the profile of the pair of adjacent fan blades, on one side on the back of one of the adjacent blades and on the other side to the front of the other of the adjacent blades. Although, when the fan spacer 126 is installed, there will be some minimal gap between the spacer body 128 and the blades which will be sealed as described in further detail below. In the form shown, the opposing sides 142 and 144 of the airflow surface 134 are disposed at the curved transitions or corners 146 and 148, respectively, between front wall 136 that contains the airflow surface 134 and the two rearwardly facing walls 150 and 152 of the triangular spacer body 128. However, in other geometries or shapes of the spacer body 128, the opposing sides 142 and 144 might be entirely or partly edges and may have other curvatures than those illustrated or be straight in part or in whole.

When installed, this airflow surface 134 will span the majority of the gap between the roots of the adjacent fan blades and direct the air coming off the nose cone 24 between the blades and, in particular, the area around their roots. In order to attach the fan spacer 126 to the central shaft 18 or hub, the rear side of the fan spacer 126 may be equipped with one or more attachment structures. For example, in the embodiment illustrated, there is a longitudinally extending opening 154 formed in a channel 156 supported by a rib 158 extending rearwardly from the front wall 136. This longitudinally extending opening 154 may receive a pin, lug or other fastening element to help secure the fan spacer 126 to the central shaft 18 or hub.

Figure 4:
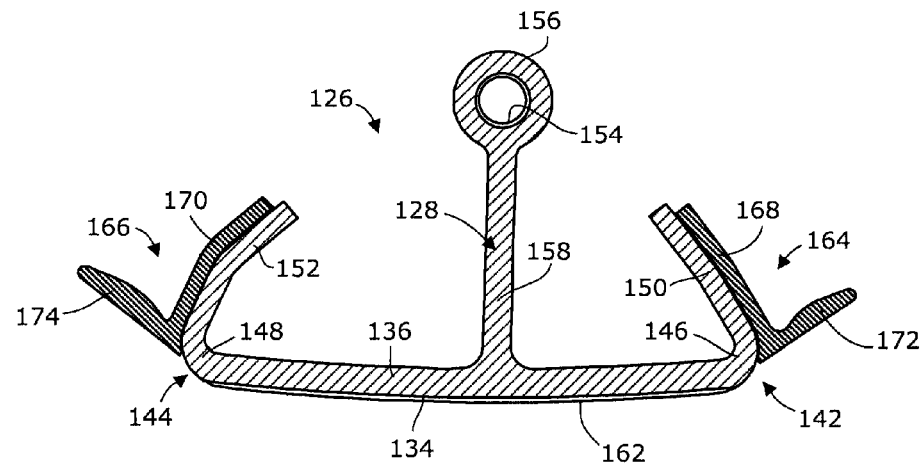
FIG. 4 is a cross-sectional view taken through line 4-4 of FIG. 3 with the seals attached to the spacer body and the erosion coating already applied.
Figure 5:
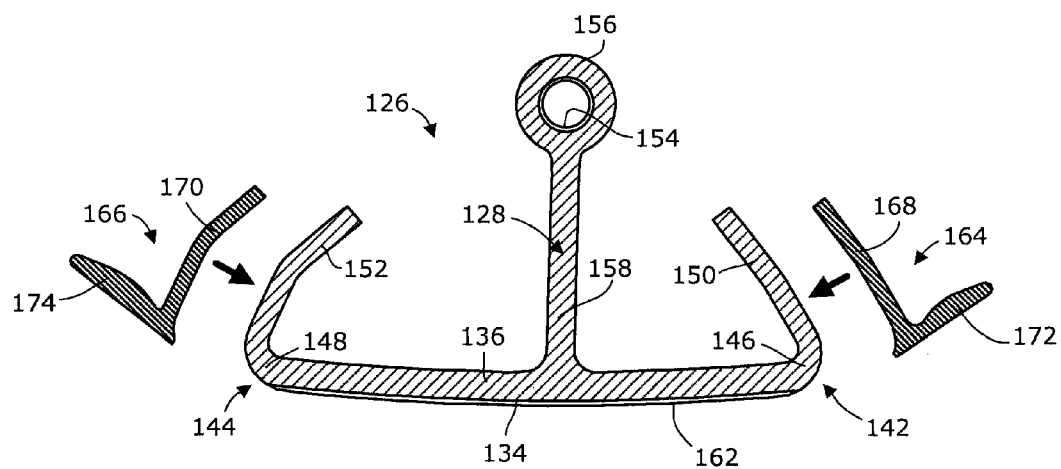
FIG. 5 is a cross-sectional view similar to FIG. 4 with the seals exploded from the spacer body in which the attachment of the seals is illustrated.

Conventionally, and as best depicted in the cross-sectional views of FIGS. 4 and 5, a separate erosion coating 162 comprising an elastomer material is sprayed onto the airflow surface 134 and substantially covers this surface from the front edge 138 to the rear edge 140 and between the opposing sides 142 and 144. This erosion coating 162 helps to protect the underlying material of the spacer body 128 and the airflow surface 134 from any debris that may contact the airflow surface 134 at high velocity.

Additionally, in order to seal the gap between the opposing sides 142 and 144 of the airflow surface 134 and the adjacent fan blades, two separate seals 164 and 166 are adhesively adhered to the opposing sides 142 and 144 as illustrated in FIG. 5 with the attachment arrows. In the form shown, the seals 164 and 166 are attached at the corners 142 and 144 and up along a portion of the rearwardly facing surfaces 150 and 152 of the triangular spacer body 128 via attachment portions 168 and 170. When the fan spacer 126 is installed in the engine 10, these seals 164 and 166 include flexible flap portions 172 and 174 that extend laterally away from the fan spacer 126 and which will each contact one of the adjacent fan blades or rotors to form a seal between the fan spacer 126 and an adjacent blade to prevent ingress of debris.

As mentioned above, it should be appreciated that conventionally, a fan spacer 126 of this type is formed in multiple locations using multiple fabrication techniques. First, the spacer body 128 is formed. In one embodiment, the spacer body 128 may be formed by laying or wrapping a plurality of layers of fabric to create a fabric ply form. Then, this form may be placed in a mold and a resin binder may be injected into the mold and cured in order to form the spacer body 128. Then, the spacer body 128 is removed from the mold and taken to a second location at which the erosion coating 162 is sprayed onto the airflow surface 134. After this, the pair of seals 164 and 166 may be attached to the opposing sides 142 and 144 of the spacer body 128. Typically this attachment may be achieved through adhesive, but other types of attachment may also be used. Again, the attachment of the seals 164 and 166 to the spacer body 128 may occur at yet a third location. However, regardless of whether the production process occurs at one location or multiple locations, multiple processes are employed that likely require multiple fixtures and separate steps that can complicate the production of the fan spacer 126.

Figure 6:
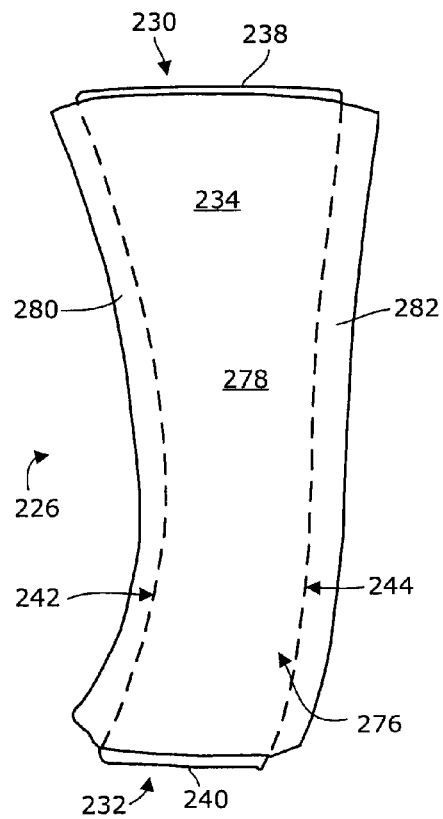
FIG. 6 is a front view of a fan spacer according to the invention in which the spacer body includes an over molded feature.
Figure 7:
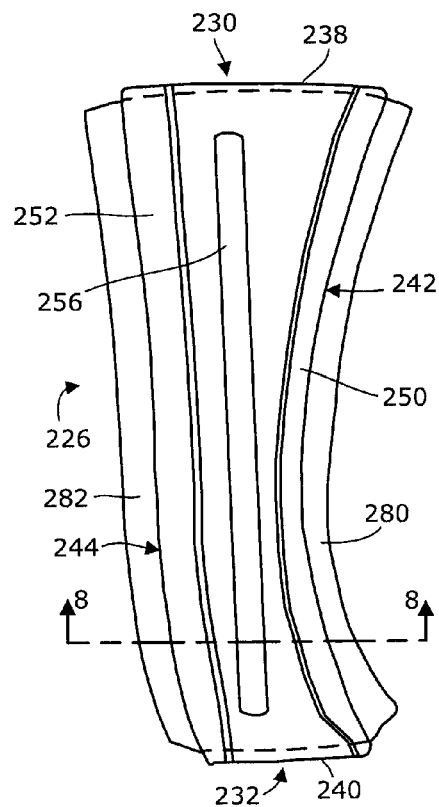
FIG. 7 is a rear view of the inventive fan spacer of FIG. 6.
Figure 8:
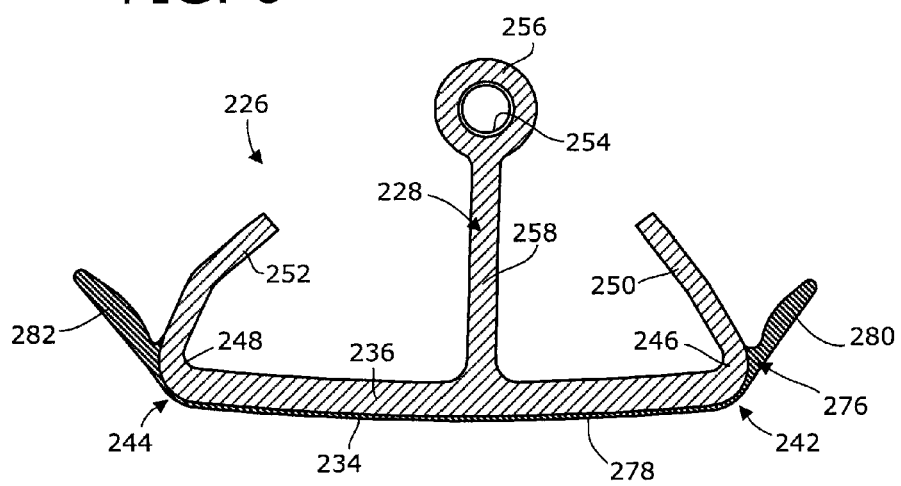
FIG. 8 is a cross-sectional view taken through line 8-8 of FIG. 7 illustrating the profile of the over molded feature comprising both the erosion coating and the pair of seals.

Turning now to FIGS. 6 through 8, an improved fan spacer 226 is illustrated. In this embodiment like numbers are used to describe like features from the embodiment illustrated in FIGS. 2 through 5. However, whereas 100 series numbers were used to describe the first conventional fan spacer, 200 series numbers are used to describe the second improved fan spacer.

The fan spacer 226 differs from the fan spacer 126 in that, rather than the spacer body 128 separately having an erosion coating 162 that is sprayed onto the airflow surface 134 and a pair of seals 164 and 166 that are adhered to the opposing sides 142 and 144 of the air flow surface 134, the fan spacer 226 includes a single, unitary, and integral over molded feature 276. This over molded feature 276 includes both an erosion coating 278 extending entirely between the opposing sides 242 and 244 and a pair of seals 280 and 282 on the opposing sides 242 and 244. This means the erosion coating 278 and seals 280 and 282 are molded together over the spacer body 226 and from the same material.

The over molded feature 276 may be molded using a urethane material. Initial testing has shown that a urethane material is able to provide improved resistance to erosion and to provide a suitable seal material on the opposing sides 242 and 244 for a seal against fan blades. However, materials other than urethane or blended with urethane might also be over molded.

In order to form the over molded feature 276, the over molded feature 276 may be injection molded directly onto the spacer body 228. This can either be incorporated into the process of forming the spacer body 228 or incorporated as a separate process.

In some forms, the over molding may be integrated into the process for forming the spacer body. For example, when the spacer body 228 is a laminate or a composite component as described above, a plurality of plies of fabric may be laid into a form or wrapped around a mandrel to create a fabric ply form. This form, still wrapped around the mandrel, may then be placed within a closed mold in which the mold parts define the outer surface of the spacer body 228. A resin binder may be injected into the fabric ply form using resin transfer molding (RTM) or the like and cured, at least partly, in order to create the spacer body 228. At this point, because the mold is a multi-part mold, a portion of the mold defining the airflow surface 234 and the corners 246 and 248 and opposing sides 242 and 244 may be removed to expose these parts of the spacer body 228. However, the portion of the mold supporting the rearwardly facing walls 250 and 252 may remain in place and support the spacer body 228. Another mold part or portion that is different than the mold part that was removed then may be placed over the airflow surface 234 and the corners 246 and 248 and the opposing sides 242 and 244 of the spacer body 228 to enclose the spacer body 228. This mold part or portion has a profile that is offset from the spacer body 228 and provides a portion of the shape of the over molded feature 276. This mold part or portion also may provide a channel or the like that permits the injection of the material used to form the over molded feature 276. With this mold part or portion in place, the over molded feature 276 is then formed directly onto the surfaces of the spacer body 228. Once the over molded feature 276 is solidified, the entire finished fan spacer 226 can be removed from the mold.

One benefit of the process described above is that, because the rear side of the spacer body 228 does not need to be removed from a fixed part or portion of the mold that is used in forming the spacer body 228, this mold part or portion provides a datum surface for the spacer body 228. Accordingly, when the second mold portion is moved into place over this fixed mold portion for the over molding operation, this second mold portion is being attached to the fixed mold portion in such a way that the surfaces of the spacer body 228 are consistently and repeatedly provided at the same location or position.

Alternatively, it is contemplated that the spacer body 228 might be formed in a first mold or tool and then completely ejected and transferred to a second fixture, mold, or tool for the over molding process. However, in this instance, there may be more variability in the dimension of the over molded feature 276 relative to the spacer body 228 because the spacer body 228 is likely to be less consistently positioned prior to the over molding operation.

Some modifications may be made to the spacer body in order to better accommodate the over molding process. For example, if the portion of the mold that is used to form the spacer body 228 remains in place for the over molding step (i.e., the spacer body 228 is never fully removed from the mold before the over molding), then the spacer body 228 may be formed such that the corners 246 and 248 at the opposing sides 242 and 244 are formed with a different draft angle to accommodate the removal of the mold portion used to form the airflow surface 234 and the corners 246 and 248 of the spacer body 228. This change in the geometry is perceivable in comparing the spacer body 128 of FIGS. 4 and 5 to the spacer body 228 of FIG. 8. Specifically, a portion of the rearwardly facing walls 250 and 252 closest to front wall 236 are shaped so they approach the front wall 236 at closer to 90 degrees (whereas, in the original geometry illustrated in FIGS. 4 and 5, the rearwardly facing walls 250 and 252 are more acutely angled with respect to the front wall 236). This modification to the spacer body 228 reduces the draft on the rearwardly facing walls 250 and 252, thereby making it possible to expose any surfaces on which the over molding will be performed. If, instead, there was a significant draft on the surfaces of the rearwardly facing walls 150 and 152 as in FIGS. 4 and 5, then it may not be possible to remove the mold portion that is used during the formation of the spacer body 128 due to the fact that the parting line between the mold parts would be located at a location that would inhibit the opening and closing of the mold.

Although a method of forming a fan spacer having an over molded feature has been described, the same processes could be used to make other components having airflow surfaces with one or more sides having a seal disposed thereon.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A fan spacer for placement between a pair of adjacent blades in a fan assembly, the fan spacer comprising:
   a spacer body including
      an airflow surface shaped to direct air between the pair of adjacent blades, the airflow surface being shaped on opposing edges to correspond to the pair of adjacent blades;
      two walls attached at the opposing edges at acute angles to the airflow surface;
      a rib attached to the airflow surface intermediate to the two walls; and
   an over molded feature molded onto the airflow surface of the spacer body, the over molded feature both including an erosion coating that is molded onto the airflow surface and, on the two opposing sides, seals configured to seal against the pair of adjacent blades on the opposing sides of the airflow surface; wherein
   the erosion coating and the seals are made in a single mold so as to form a single piece whereby the erosion coating and the seals are unitary and integrally formed with one another.

2. The fan spacer of claim 1, wherein the over molded feature comprises a urethane material.

3. The fan spacer of claim 1, wherein the spacer body is a composite component comprising a plurality of plies of fabric and a resin binder.

4. The fan spacer of claim 3, wherein the plurality of plies of fabric and the resin binder form a laminate.

5. The fan spacer of claim 3, wherein the resin binder is curable.

6. The fan spacer of claim 1, wherein each of the opposing sides are curved.

7. An airflow component comprising:
   a body including an airflow surface shaped to direct air and having at least one edge bounding the airflow surface; and
   an over molded feature molded onto the airflow surface of the body, the over molded feature including both an erosion coating that is molded onto the airflow surface and a seal on the at least one edge of the airflow surface, the seal including a flexible flap portion; wherein
   the erosion coating and the seals are made in a single mold so as to form a single piece whereby the erosion coating and the seals are unitary and integrally formed with one another.

8. A fan spacer for placement between a pair of adjacent blades in a fan assembly, the fan spacer comprising:
   a spacer body including an airflow surface shaped to direct air between the pair of adjacent blades, the airflow surface being shaped on opposing edges to correspond to the pair of adjacent blades;
   two walls attached at the opposing edges at acute angles to the airflow surface; and
   an over molded feature molded onto the airflow surface of the spacer body, the over molded feature including both an erosion coating that is molded onto the airflow surface and, on the two opposing edges, seals configured to seal against the pair of adjacent blades on the opposing sides of the airflow surface; wherein
   the erosion coating and the seals are made in a single mold so as to form a single piece whereby the erosion coating and the seals are unitary and integrally formed with one another.

9. The fan spacer of claim 1, wherein the seals each include a flexible flap portion.

10. The fan spacer of claim 1, wherein the rib includes an opening disposed at an end portion of the rib.

11. The airflow component of claim 7, further comprising a rib attached to the airflow surface spaced apart from the at least one edge.

12. The airflow component of claim 11, wherein the rib includes an opening disposed at an end portion of the rib.

13. The airflow component of claim 7, further comprising:
   at least two edges bounding the airflow surface; and
   walls attached at the edges at acute angles to the airflow surface.

14. The fan spacer of claim 8, wherein the seals each include a flexible flap portion.

* * * * *